(12) United States Patent
Gattermann et al.

(10) Patent No.: US 9,417,156 B2
(45) Date of Patent: Aug. 16, 2016

(54) METHOD AND DEVICE FOR ASSESSING THE DAMAGE TO ROLLING BEARINGS, IN PARTICULAR IN INVERTER-FED ELECTRIC MACHINES

(75) Inventors: Sven Gattermann, Zirndorf (DE); Ralf Kowalewski, Fürth (DE); Carsten Probol, Buckenhof (DE); Arno Steckenborn, Berlin (DE); Oliver Theile, Berlin (DE); Hans Tischmacher, Lauf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 887 days.

(21) Appl. No.: 13/580,903

(22) PCT Filed: Feb. 3, 2011

(86) PCT No.: PCT/EP2011/051589
§ 371 (c)(1),
(2), (4) Date: Aug. 23, 2012

(87) PCT Pub. No.: WO2011/104098
PCT Pub. Date: Sep. 1, 2011

(65) Prior Publication Data
US 2012/0319636 A1 Dec. 20, 2012

(30) Foreign Application Priority Data

Feb. 24, 2010 (DE) .......................... 10 2010 002 297

(51) Int. Cl.
*H02P 7/00* (2016.01)
*G01M 13/04* (2006.01)
(52) U.S. Cl.
CPC .................................... *G01M 13/04* (2013.01)

(58) Field of Classification Search
CPC ........ H02K 11/001; G07C 3/00; G01M 13/04
USPC .......................................................... 318/490
See application file for complete search history.

(56) References Cited

U.S. PATENT DOCUMENTS 6,621,525 B1 * 9/2003 Ueda et al. .................... 348/618
7,948,779 B2 5/2011 Bauer et al.
(Continued)

FOREIGN PATENT DOCUMENTS

CN 2010/062999 5/2008
CN 101405611 A 4/2009
(Continued)

OTHER PUBLICATIONS

Delgado M et al: "Bearing Diagnosis Methodologies by means of Common Mode Current", Power Electronics and Applications, 2009, EPE '09 13th European Conference on IEEE Piscataway, NJ, USA, Sep. 8, 2009, pp. 1-10, XP031541412, ISBN: 978-1-4244-4432-8; Others; 2009; 2011Q11543.
(Continued)

*Primary Examiner* — Eduardo Colon Santana
*Assistant Examiner* — Gabriel Agared
(74) *Attorney, Agent, or Firm* — Henry M. Feiereisen

(57) ABSTRACT

A method and device for assessing damage to a rolling bearing caused by bearing currents, in particular high-frequency bearing currents, in an electric machine which is electrically connected to an inverter, in particular to an inverter having a DC voltage link circuit, is described. The rolling bearing has a lubrication gap between an inner bearing ring and a rolling body and between an outer bearing ring and the rolling body. The method includes detecting the energy of an electric discharge event in the lubrication gaps, searching for a coincident event having a frequency above one GHz indicative of a damaging bearing current event, detecting a frequency of occurrence of discharge events, and evaluating the discharge events by correlating the frequency of occurrence and the energy of the discharge events.

19 Claims, 2 Drawing Sheets

(56) References Cited

U.S. PATENT DOCUMENTS

| | | |
|---|---|---|
| 2005/0184751 A1 | 8/2005 | Hobelsberger |
| 2009/0125858 A1* | 5/2009 | Vishweshwara et al. ......... 716/6 |
| 2009/0302864 A1* | 12/2009 | Marinov ....................... 324/557 |
| 2010/0027302 A1 | 2/2010 | Bauer et al. |
| 2011/0175631 A1 | 7/2011 | Kretschmer et al. |

FOREIGN PATENT DOCUMENTS

| | | |
|---|---|---|
| DE | 102004056996 A1 | 6/2006 |
| EP | 1835598 A1 | 9/2007 |
| EP | 2221597 A1 | 8/2010 |
| RU | 129235 U1 | 6/2013 |
| WO | WO 2010085971 A1 * | 8/2010 .............. F16C 19/52 |

OTHER PUBLICATIONS

David Dahl et al: "Gear up your bearings", IEEE, Industry Applications Magazine, IEEE Service Center, Piscataway, NJ, USA, Bd. 14, No. 4, Jul. 1, 2008, pp. 45-53, XP011216144, ISSN: 1077-2618; Others; 2008; 2011Q11553.

* cited by examiner

METHOD AND DEVICE FOR ASSESSING THE DAMAGE TO ROLLING BEARINGS, IN PARTICULAR IN INVERTER-FED ELECTRIC MACHINES

CROSS-REFERENCES TO RELATED APPLICATIONS

This application is the U.S. National Stage of International Application No. PCT/2011/051589, filed Feb. 3, 2011, which designated the United States and has been published as International Publication No. WO 2011/104098 and which claims the priority of German Patent Application, Serial No. 10 2010 002 297.7, filed Feb. 24, 2010, pursuant to 35 U.S.C. 119(a)-(d).

BACKGROUND OF THE INVENTION

The invention relates to a method and a device for assessing the damage to rolling bearings of electric machines, in particular of inverter-fed electric machines.

Parasitic effects, which include a flow of current via the bearings of the respective motor, arise in electric machines, in particular in motors with inverter feeding.

With larger electric motors which are connected directly to a sine-wave electrical network, bearing currents occur in particular which are caused by asymmetries of the electrical circuit, manufacturing tolerances and material anisotropies. The asymmetrical distribution of the magnetic flux in the motor induces a voltage in the shaft of the electrical machine which leads to a low-frequency current flow through the bearings. These currents circulate in a closed circuit of shaft—bearing—bearing plate—housing.

Interruption of this current flow is achieved by isolating the bearing.

In electrical machines with electrical feed by an inverter, especially an intermediate circuit voltage converter, the output voltage is generated by regulated switching of the direct current intermediate circuit, which is then present at the output of the inverter. A switch from positive and negative potential in a rapid sequence leads in a two-point inverter to a voltage curve of which the sum of the three-phase current is not equal to zero and is referred to as common-mode voltage.

Each of these steep current switching actions causes high-frequency excitations which lead to high-frequency harmonic waves with the currents resulting therefrom which flow back via parasitic paths to the source, i.e. to the inverter voltage link.

These currents can cause changes to the movement path in the bearings, especially in the rolling bearings. With major changes to the movement path the rolling bearings initially cause noise when rolling over the surface. The bearing then fails later with fatigue damage, which can lead to the failure of the electrical machine or to it sustaining damage.

The bearings involved thus have to be changed before they reach the desired bearing lifetime, which results in unplanned costs.

For motors embedded into systems an electrical bearing load is deduced from external measurements. In such procedures an attempt is made, by measuring the ground currents, shaft currents and shaft voltages or by making noise measurements, to produce a state description of the bearing. This state description is extremely imprecise however. Therefore, for the sake of safety, the bearings have to be changed long before they actually fail.

On this basis, the underlying object of the invention is to create a more exact method compared to the previous noise and comparison measurements to enable the remaining lifetime of a bearing to be estimated more accurately.

SUMMARY OF THE INVENTION

The desired object is attained by a method for assessing damage to a rolling bearing of an electrical machine which is connected electrically to an inverter, especially to an inverter with an intermediate voltage circuit, wherein this damage is caused by bearing currents, especially by high-frequency bearing currents,
wherein each rolling bearing has a lubrication gap between an inner bearing ring and a rolling body and between an outer bearing ring and the rolling body, by the following steps:
  Detecting the energy of an electrical discharge event in the lubrication gap of the rolling bearing,
  Searching for a coincident event having a frequency above one GHz indicative of a damaging bearing current event,
  Detecting the frequency of occurrence of the discharge events,
  Evaluating the discharge events by correlation of frequency of occurrence and energy of the discharge events.

The desired object is also attained by a device for assessing damage to a rolling bearing of a dynamo-electrical machine, which is connected electrically to an inverter, especially to an inverter with a voltage link, wherein this damage is caused by bearing currents, especially high-frequency bearing currents, wherein each rolling bearing has a lubrication gap between an inner bearing ring and a rolling body and between an outer bearing ring and the rolling body, with
  a device for measuring energy content of discharge events in the lubrication gap,
  a device for searching for a coincident event having a frequency above one GHz indicative of a damaging bearing current event,
  a device for detecting the frequency of occurrence of a discharge event,
  an evaluation device which evaluates data associated with the frequency of occurrence and of the energy content of the discharge events.

Inventively the direct detection of the energy transfer taking place in the lubrication gap makes possible an exact assessment of the damage or of the remaining lifetime of the bearing, which also provides a classification through appropriate evaluation methods.

The voltage difference leads to arc discharges and thus to a flow of current over the lubrication film of the bearings and thus to melting or evaporation of material in the bearing tracks. An even melting structure does not generally represent a problem in such cases in respect of the lifetime of the bearing tracks. Only if bearing track material is partly evaporated on continuity does damaging rifling occur. This rifling is characterized by a characteristic mountain and valley structure oriented at right angles to the rolling direction of the rolling bodies.

A far higher energy is necessary for material evaporation in such cases compared to that which is necessary for material melting of the identical material volume.

These types of energy observations have not previously been carried out.

With a sufficiently high voltage across a bearing of an electrical machine the result is that the arcing voltage of the lubrication film is exceeded and the arc is thus generated between the bearing bodies and the inner or outer ring. Depending on the energy created in the lubrication gap, this can now result in melted areas in the track of the rolling bodies or even to evaporation of material on the rolling body or the outer or inner ring.

Material evaporations are however the precondition for the embodiment of the damaging rifle structure.

Both processes, material melting and material evaporation, require a specific minimum energy however, which can be obtained from thermodynamic calculations. Directly measured for this in a discharge event are either the electrical current through the bearing and/or the electrical voltage across the bearing. By determining the respective instantaneous power P=U*I of a discharge event and summing these individual instantaneous powers by integration over time, the electrical energy created in the lubrication gap is determined. In such cases the time in each case is a characteristic time constant with which the event occurs.

If this energy is greater than the minimum energy for material evaporation the result can now be the formation of rifling. Thus it can now be assessed from the amount of energy in the lubrication film as to whether a bearing tends towards rifling.

Furthermore a critical overall evaporation volume per rifle from which a bearing fails can be obtained from empirical operating data of which the specific values are stored in a database. Thus from the frequency of these critical events the time until a possible failure of the bearing can be calculated.

Through the inventive procedure for measuring or monitoring electrical characteristic data of the bearing currents the characteristics of the curves of the pulse-shaped discharge processes can now be detected which cause the irreversible changes in the area of the bearing tracks, the rolling bodies and/or the lubricants active in the lubrication gaps.

Through the inventive approach in respect of the bearing current measurement and the corresponding evaluation it is possible in such cases to determine the locally applied energies associated with the discharge processes or the timing curve of the local power densities.

Basically, depending on the local power density, there are at least the following options for grouping into different classes the effect of a continuity event on the rolling bearing components:

The local power density of the current flow is so small that it does not result in either an effect on the track surfaces or an effect on the lubricant, e.g. in direct metallic contact of the rolling bodies the operating situation is thus not critical.

The local power densities of the current flow, i.e. the discharge or the solid state transport of the current already causes a thermal change in the lubricant without however changing the track surface. Thus a preliminary stage for a critical state of the bearing is present. With permanently lubricated bearings in particular and if the intended lubrication intervals are not adhered to, an extremely critical state can result from this.

Ultimately however this case is still relatively non-critical for the operating behavior of the electrical machine.

The local power density of the current flow is sufficient to cause a local melting of the track surfaces and to alter the lubricant of the rolling bearing. A critical state thus already exists.

The local power density of the current flow is so high that the track surface is initially melted locally and subsequently evaporated and the lubricant is additionally altered. In this case estimates are produced for specific rolling bearing steels that with continuity events which have an energy density higher by around an order of magnitude than those which are only needed for local melting of the surface, the evaporation of the respective surface areas starts.

Rifling structures are caused by additional mechanical influences such as prior mechanical damage to the track, which cannot be basically excluded, primarily caused by discharge events, of which the energies, especially local power densities, lead to local melting which however also reaches a high proportion of the evaporation energies of the corresponding surface areas.

For melting in the bearing rings as well as in the bearing body surfaces two criteria are to be fulfilled. The energy of the bearing current event or the local power density must be sufficiently high or exceed a specific value. Furthermore the pulse may not exceed a specific maximum duration, since otherwise the heat can already be transported away in the material or can flow away and thus does not result in any melting or even evaporation of metals of the bearing track.

The result of different measurements shows that it is possible to check or to measure the conditions independently of one another. For this it is especially advantageous to detect the discharge event in two different frequency bands. The delay time of the bearing voltage can be determined as a measure of the energy content of the event in a single to multi-digit megahertz range. The level of the bearing current results from the ratio C*dU/dt e. If a search is now made for a coincident event in the microwave range above 1 GHz, such an event shows that a bearing current event likely to damage the bearing must be assumed.

The division of the two frequency bands is especially advantageous since with the restricted bandwidth in the baseband of a few megahertz a conclusion about the damaging effects cannot necessarily be drawn. On the other hand the transmission of microwaves is subjected to extreme fluctuations. Through these imprecisions of the measurements in the microwave range it is not possible here to determine the pulse energy and this must thus be done in another frequency band, i.e. the megahertz band.

With all inventive recordings the sampling theorem is naturally to be taken into account in order to obtain meaningful results.

Detection in the Gigahertz range is advantageously undertaken using antennas.

The decisive factor however is always the effective pitting energy which only has to flow within a short time interval, particularly in the range of a few hundred picoseconds, so that the energy does not flow away through thermal transfer in such a great volume that damage is no longer caused. This typically short time interval is a significant key parameter for rifling of the bearing components, such as rolling bodies, inner bearing ring and outer bearing ring.

The effective pitting energy per unit of time is the energy which is released during a specific short time interval in the bearing by discharge. The time interval is determined on the basis of the pit diameter $D_K$ and the speed of sound V.

Typical values are $$D_K = 1 \text{ μm}, V = 2000\frac{m}{s} = 2\frac{\text{μm}}{ns}$$

$$\Delta T = \frac{D_K}{2} \cdot \frac{1}{V} = 250 \text{ ps}$$

The effective pitting energy is thus determined as follows:

$$W_{KE} = \frac{\Delta \frac{1}{2} C \cdot U_{bearing}^2}{\Delta T}$$

To detect the effective pitting energy on the one hand either a current measurement or a voltage measurement or a simultaneous current and voltage measurement is necessary. Together with the measurement explained above of such events in the microwave range, i.e. above 1 GHz, such discharge arrangements can be determined precisely over time and in their energy content.

For the current measurement an additional isolation at the bearing with a bridging is necessary with a simultaneous installation of high-frequency-proof bridging via which the current flow can be measured.

Also an associated simultaneous measurement of the bearing voltage and thus the calculation of the power is possible. This power corresponds to the energy transferred in a period of time.

A further option for obtaining the effective pitting energy leads via the discharge energy and the capacitance across the bearing in accordance with the following mathematical relationship:

$$BVR = U_{bearing} / U_{common}$$
$$BVR = f(C_{bearing})$$
$$C_{bearing} = f^{-1}(U_{common} / U_{bearing})$$
$$W_{discharge}(t) = \frac{1}{2} C U_{bearing}^2$$
$$W_{KE} = \frac{\Delta \frac{1}{2} C \cdot U_{bearing}^2}{\Delta T}$$

$U_{common}$: Common-mode voltage at the motor terminals
$U_{bearing}$: Voltage across the motor bearing (bearing voltage)
t: Time
BVR Bearing Voltage Ratio, ratio of $U_{bearing}$ to $U_{common}$
$C_{bearing}$: Capacitance across the motor bearing
f: Function, to be determined on the basis of the equivalent circuit diagram
$f^{-1}$: Converse function to f
$W_{KE}$: Effective pitting energy The voltage at the bearing of the electrical machine is measured by a specific voltage sensor with an analog circuit for example or by numerical signal processing as follows. The relationship now enables the effective pitting energy to be deduced.

The energy distribution is presented and evaluated for example in a diagram by the amplitude of the energy being plotted against the measured voltage. The results of an ongoing measurement in the operation of the dynamo-electric machine are an accumulation of measurement points in the shape of the type of energy cloud which describes the energy loading of the bearing. This method of representation in particular enables critical energy discharges to be made recognizable.

The events are also represented in a further embodiment in a 3D diagram. The third dimension in this case especially represents the frequency of the occurrence in a so-called "false color diagram". (For example the redder the more frequent).

With the aid of a downstream logic which provides predeterminable, material-dependent threshold values, it is possible to also visualize this for an end user in a type of traffic light system and thereby as a warning system. With the measurement of the corresponding dwell time at a bearing energy level, within long-term evaluations information can be provided about the possible life of the beating.

Advantageously bearings or the bearing plates are already equipped with the necessary measurement connections for voltage and/or current and/or detection in the GHz range. When these types of bearing/bearing plate are built into electrical machines it is possible to simply position evaluation devices with corresponding storage space and analysis options in or on the electrical machine without having to implement a separate RF-proof measurement setup.

The measurement connections can thus already be implemented and checked for withstanding high frequencies during the manufacture of the bearings or bearing plates, so that measurement errors during operation of the electrical machine as a result of "flying measurement setups" can be minimized.

Likewise the measurement results or evaluations can be transferred to a maintenance center via corresponding transmission paths (wired or wirelessly).

BRIEF DESCRIPTION OF THE DRAWING

The invention and further advantageous embodiments of the invention are to be taken from the figures, in which.

DETAILED DESCRIPTION OF PREFERRED EMBODIMENTS

Figure 1:
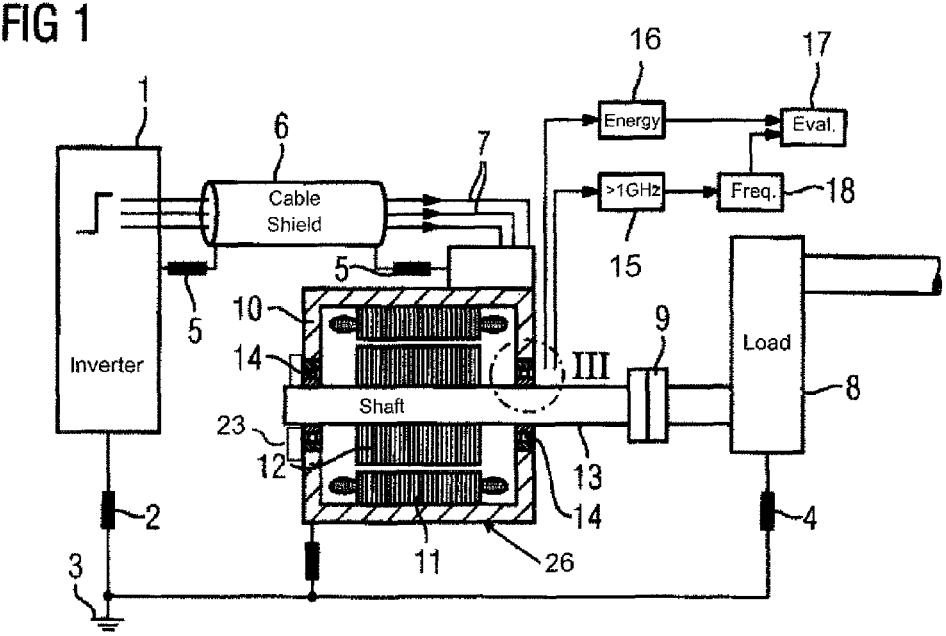
FIG. 1 shows a basic system configuration.

FIG. 1 shows in a basic diagram a configuration of a dynamo-electric rotational machine 26 with surrounding system parts. Individually in this diagram an inverter 1 is connected via connecting leads 7 to the a dynamo-electric machine 26 which is located within a motor housing 10 and has a stator 11 and a rotor 12, which via bearings 14 and a shaft 13 via a coupling 9 drives a load machine 8 or are driven by it.

The electrical connection between inverter 1 and dynamo-electric machine 26 by the connecting cable 7 features a cable screen 6 which has a corresponding link 5 to the ground of inverter 1 or motor housing 10. Both inverter 1 and also the load machine 8 are connected to ground 3 via a grounding 2 or 4. Likewise the electrical machine is especially connected electrically via a foot of the motor housing 10 not shown in any greater detail to the system ground.

The output voltage of the inverter 1, especially embodied as a voltage link inverter, is present through regulated switching of the intermediate voltage circuit at the output. A switch between positive and negative potential in a rapid sequence leads with a two-point inverter to a voltage curve of which the sum of the three-phase voltage is not equal to zero and produces the common-mode voltage.

A bearing 14, especially a rolling bearing, has a number of evenly distributed rolling bodies between an outer bearing ring and an inner bearing ring. The outer bearing ring is normally positioned in a bearing plate 23, while the inner bearing ring is disposed directly on a shaft. There is lubricating film of a thickness of a few tens of micrometers in each case especially between the bearing rings and the rolling bodies.

Figure 2:
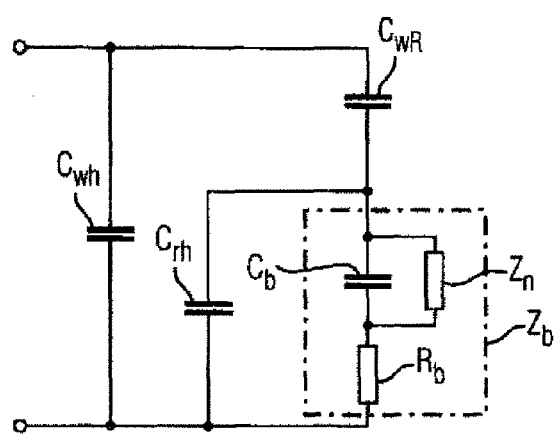
FIG. 2 shows an RF equivalent circuit diagram of a motor.

At the lubrication gap of the bearing 14 the capacitive voltage divider in accordance with FIG. 2 brings about a complete image of the common-mode voltage which differs in amount from this by the Bearing Voltage Ratio BVR. In this case BVR is the ratio of the bearing voltage to the common-mode voltage at the motor terminals.

Figure 3:
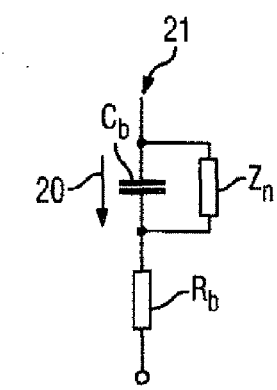
FIG. 3 shows an equivalent circuit diagram of a bearing.

$C_{wh}$ Stator winding and housing
$C_{wr}$ Stator winding and rotor iron
$C_{rh}$ Rotor iron and housing
$C_b$ Lubricating film of bearing
$Z_n$ Non-linear impedance of the lubricating film on arcing (arc)
$R_b$ Ohmic resistance of bearing The voltage present between the motor terminals and at the housing is to be measured in accordance with the bearing voltage ratio BVR across the bearing, as is shown for example in FIG. 3. FIG. 3 shows the part of the capacitive voltage divider of FIG. 2 enclosed by the dash-dotted box. The capacitance of the lubricating film of the bearing $C_B$ is charged by the capacitance of the rotor winding and rotor iron in a pulse shape by the charge current 21 of the lubricating film capacitance, if the lubricating film is isolated and the rotor 12 is not grounded. The ratio BVR is a measure of the level of this charge. If the voltage at the bearing exceeds the arcing voltage of the bearing lubricating film, the result is the electrical disruptive discharge of the lubricating film.

The dynamo-electric machine 26 is also operatively connected with a device 15 for identifying a coincident event having a frequency above one GHz indicative of a damaging bearing current event, and a device 16 for measuring enemy of an electric discharge event in the lubrication gaps, wherein the device 16 is disposed in the bearing 14 or in a bearing plate 23 (as schematically indicated by the circle III in FIG. 1, which refers to the current/voltage measurement circuit shown in FIG. 3) and measures a voltage, a current and/or high-frequency processes across the lubrication gaps. A device 18 detects a frequency of occurrence of discharge events based on signals received from the device 15. An evaluation device 17 then evaluates data associated with the frequency of occurrence and the energy of the discharge events. The evaluation device 17 may be attached in or on the motor housing 10 of the electrical machine 26; the attachment is not shown explicitly in FIG. 1 for sake of clarity of the drawing.

The voltage 20 across the lubricating film isolation leads, depending on the level of the voltage, to a discharge. The discharge occurs within the bearing and leads, depending on the information given above, to melting or evaporation points in the bearing tracks, i.e. to microcraters on the tracks of the rolling bodies.

Figure 4:
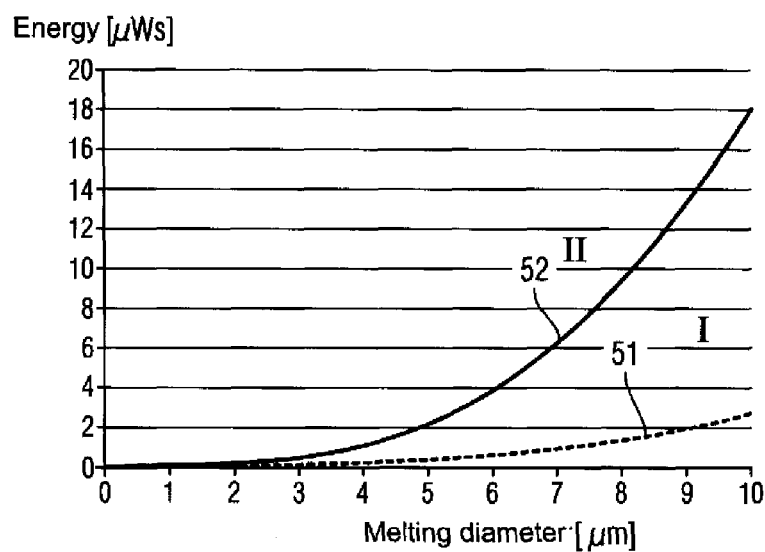
FIG. 4 shows a diagram.

FIG. 4 shows a diagram of the energy plotted against the melting diameter, with energy in the area I leading to melting of a crater and in the area II the energy being sufficient to achieve an evaporation of the metal, especially steel on the tracks or the rolling bodies.

Figure 5:
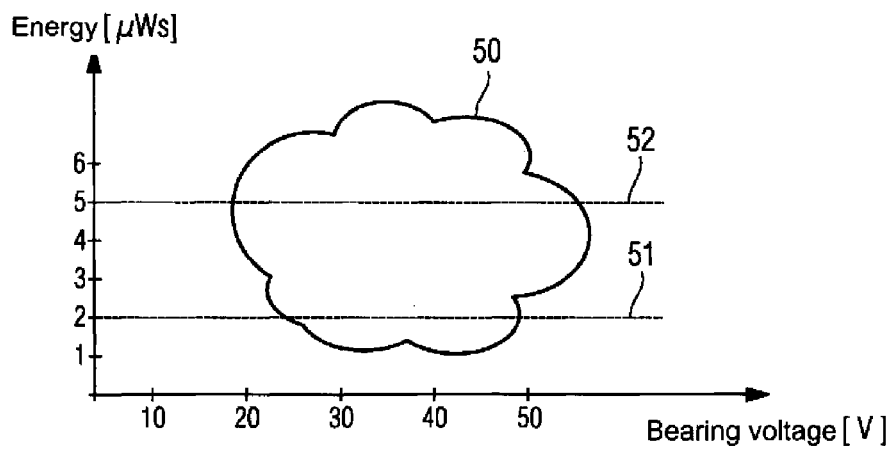
FIG. 5 shows a further diagram for the evaluation.

FIG. 5 shows in a further diagram the energy plotted against the bearing voltage for the corresponding pulses. In this case an evaporation energy 52 and a melting energy 51 is shown and the individual measurement points are located in a cloud 50, so that in respect of each individual measurement point or its frequency, a statement can be made about the remaining life of the bearing.

What is claimed is:

1. A method for assessing damage to a rolling bearing of an electric machine connected to an inverter caused by bearing currents, wherein the rolling bearing has lubrication gaps disposed between an inner bearing ring and a rolling body and between an outer bearing ring and the rolling body, the method comprising the steps of:
    searching for discharge events by performing measurements in two different frequency ranges, wherein a first frequency range is located in a single-digit to multi-digit megahertz range, and a second frequency range is located at a frequency above one GHz,
    determining an energy of an electric discharge event in at least one of the lubrication gaps from a measurement in the first frequency range,
    searching in the second frequency range for a discharge event coincident with the electric discharge event,
    measuring a frequency of occurrence of coincident discharge events, and
    correlating the coincident discharge events with damaging bearing current events.

2. The method of claim 1, wherein the energy is determined by measuring a voltage generated across the at least one lubrication gap and by a capacitance across the at least one lubrication gap.

3. The method of claim 1, wherein the energy is determined by measuring a voltage generated across the at least one lubrication gap and across an additional insulation, and by a capacitance across the at least one lubrication gap.

4. The method of claim 1, wherein the energy is determined by measuring an electric bearing current.

5. The method of claim 4, wherein the energy is determined by measuring a voltage generated across the at least one lubrication gap and across an additional insulation.

6. The method of claim 4, wherein the bearing current is measured by bridging the additional insulation with a high-frequency bridge.

7. The method of claim 1, wherein the energy is determined by measuring a voltage and a current in a time interval determined by the first frequency range.

8. The method of claim 1, wherein the discharge event above one GHz is detected with an antenna.

9. The method of claim 1, wherein the inverter comprises a DC voltage link circuit.

10. A device for assessing damage to a rolling bearing of an electrical machine connected to an inverter caused by bearing currents, wherein the rolling bearing has respective lubrication gaps disposed between an inner bearing ring and a rolling body and between an outer bearing ring and the rolling body, the device comprising:
    a device for searching for discharge events by performing measurements in two different frequency ranges, wherein a first frequency range is located in a single-digit to multi-digit megahertz range, and a second frequency range is located at a frequency above one GHz,
    a device for measuring energy of an electric discharge event in the lubrication gaps from a measurement in the first frequency range,
    a device for identifying in the second frequency range a discharge event coincident with the electric discharge event,
    a device for measuring a frequency of occurrence of coincident discharge events, and
    an evaluation device which evaluates the coincident discharge events for assessing the damage.

11. The device of claim 10, wherein the device for measuring the energy of an electric discharge event comprises voltage sampling devices which measure voltage signals across the lubrication gaps in a picosecond range.

12. The device of claim 11, wherein data from the voltage sampling devices are forwarded to the evaluation device which receives and stores the data.

13. The device of claim 11, wherein the evaluation device comprises an oscilloscope with a suitable limiting frequency.

14. The device of claim 10, wherein the device for measuring the energy of an electric discharge event comprises a high frequency current converter measuring a current across the lubrication gaps.

15. The device of claim 14, wherein measured current is a discharge current.

16. The device of claim 14, wherein data from the high-frequency current converter are forwarded to the evaluation device which receives and stores the data.

17. The device of claim 10, wherein the inverter comprises a DC voltage link circuit.

18. A bearing of an electric machine, comprising:
a bearing plate,
lubrication gaps disposed between an inner bearing ring and a rolling body and between an outer bearing ring and the rolling body, and
a device for searching for discharge events by performing measurements in two different frequency ranges, wherein a first frequency range is located in a single-digit to multi-digit megahertz range, and a second frequency range is located at a frequency above one GHz,
a device for measuring energy of an electric discharge event in the lubrication gaps from a measurement in the first frequency range, said device including measurement devices disposed in the bearing or in a bearing plate for measuring at least one of a voltage, a current and high-frequency processes across the lubrication gaps,
a device for identifying in the second frequency range a discharge event coincident with the electric discharge event,
a device for measuring a frequency of occurrence of coincident discharge events, and
an evaluation device which evaluates the coincident discharge events for assessing the damage to the bearing.

19. An electrical machine connected to an inverter, comprising:
a bearing plate,
lubrication gaps disposed between an inner bearing ring and a rolling body and between an outer bearing ring and the rolling body, and
a device for searching for discharge events by performing measurements in two different frequency ranges, wherein a first frequency range is located in a single-digit to multi-digit megahertz range, and a second frequency range is located at a frequency above one GHz,
a device for measuring energy of an electric discharge event in the lubrication gaps from a measurement in the first frequency range, said device including measurement devices disposed in the bearing or in a bearing plate for measuring at least one of a voltage and a current across the lubrication gaps,
a device for identifying in the second frequency range a discharge event coincident with the electric discharge event,
a device for measuring a frequency of occurrence of coincident discharge events, and
an evaluation device attached in or on a motor housing of the electrical machine, said evaluation device evaluating the coincident discharge events for assessing damage to the bearing.

* * * * *